United States Patent
Bulusu et al.

(10) Patent No.: US 9,996,142 B2
(45) Date of Patent: Jun. 12, 2018

(54) SELECTIVE POWER MANAGEMENT FOR PRE-BOOT FIRMWARE UPDATES

(71) Applicant: Intel Corporation, Santa Clara, CA (US)

(72) Inventors: Mallik Bulusu, Olympia, WA (US); Vincent J. Zimmer, Federal Way, WA (US); Krishna Kumar Ganesan, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days. days.

(21) Appl. No.: 14/915,353

(22) PCT Filed: Oct. 31, 2013

(86) PCT No.: PCT/US2013/067725
§ 371 (c)(1),
(2) Date: Feb. 29, 2016

(87) PCT Pub. No.: WO2015/065417
PCT Pub. Date: May 7, 2015

(65) Prior Publication Data
US 2016/0231804 A1 Aug. 11, 2016

(51) Int. Cl.
*G06F 1/00* (2006.01)
*G06F 1/32* (2006.01)
(Continued)

(52) U.S. Cl.
CPC .......... *G06F 1/3287* (2013.01); *G06F 1/3234* (2013.01); *G06F 8/665* (2013.01);
(Continued)

(58) Field of Classification Search
CPC .............................. G06F 1/3287; G06F 9/4401
(Continued)

(56) References Cited

U.S. PATENT DOCUMENTS 7,765,393 B1    7/2010  Lee
8,230,237 B2    7/2012  Yao
(Continued)

FOREIGN PATENT DOCUMENTS

JP    2001-273143 A    10/2001
JP    2006-216048 A    8/2006
(Continued)

OTHER PUBLICATIONS

International Search Report for PCT/US13/067725, dated Jul. 31, 2014 (3 pages).
(Continued)

*Primary Examiner* — Austin Hicks
(74) *Attorney, Agent, or Firm* — Barnes & Thornburg LLP

(57) ABSTRACT

Technologies for updating firmware in a pre-boot environment include a mobile computing device having a firmware environment and an operating system. In the pre-boot environment, the mobile computing device extracts a firmware update from a capsule previously generated by the operating system and determines a power consumption setting for a hardware component as a function of the firmware update. The mobile computing device configures the hardware component based on the power consumption setting and applies the firmware update in response to configuring the hardware component. The firmware update may include a firmware driver executable in the firmware environment. The hardware component may include a peripheral device or a device controller of the mobile computing device. The mobile computing device may determine a power policy as a function of the firmware update, and determine the power consumption setting as a function of the power policy. Other embodiments are described and claimed.

19 Claims, 4 Drawing Sheets

(51) Int. Cl.
*G06F 9/44* (2018.01)
*G06F 9/445* (2018.01)

(52) U.S. Cl.
CPC .............. *G06F 8/67* (2013.01); *G06F 9/4401* (2013.01); *G06F 9/4411* (2013.01); *Y02B 60/1282* (2013.01); *Y02B 60/183* (2013.01)

(58) Field of Classification Search
USPC ........................................................ 713/100
See application file for complete search history.

(56) References Cited

U.S. PATENT DOCUMENTS

| | | | |
|---|---|---|---|
| 2003/0070115 A1 | 4/2003 | Nguyen | |
| 2004/0267708 A1 | 12/2004 | Rothman | |
| 2005/0144609 A1* | 6/2005 | Rothman | G06F 11/1433 717/168 |
| 2013/0031538 A1 | 1/2013 | Skalsky | |
| 2013/0268922 A1* | 10/2013 | Tiwari | G06F 8/67 717/168 |

FOREIGN PATENT DOCUMENTS

| | | |
|---|---|---|
| JP | 2007-281810 A | 10/2007 |
| JP | 2009-211339 | 9/2009 |
| JP | 2010-009474 | 1/2010 |
| JP | 2013-011982 | 1/2013 |
| KR | 10-2013-0107313 A | 10/2013 |
| WO | WO2012067882 A2 | 5/2012 |
| WO | WO2012067882 A3 | 5/2012 |

OTHER PUBLICATIONS

Written Opinion for PCT/US13/067725, dated Jul. 31, 2014 (6 pages).
Notice of Preliminary Rejection for Korean Patent Application No. 10-2016-7005647, dated Apr. 15, 2017, 6 pages.
Office Action and English Translation for Japanese Patent Application No. 2016-516914, dated Mar. 21, 2017, 10 pages.
European Search Report for Application No./Patent No. 13896258.4-1879/3063620, dated Jun. 21, 2017, 9 pages.

* cited by examiner

SELECTIVE POWER MANAGEMENT FOR PRE-BOOT FIRMWARE UPDATES

CROSS REFERENCE TO RELATED APPLICATIONS

This application is a national stage entry under 35 USC § 371(b) of International Application No. PCT/US2013/67725, which was filed Oct. 31, 2013.

BACKGROUND

Computing devices typically include firmware responsible for hardware initialization, low-level hardware management, and managing the boot process. The main platform firmware responsible for booting the computing device may be implemented according to the Unified Extensible Firmware Interface ("UEFI") specification, which has several versions published by the Unified EFI Forum. The UEFI specification specifies an interface between the firmware of the computing device and the operating system of the computing device. In addition to the platform firmware, computing devices may also include dedicated firmware for controller chips, peripheral devices, or other components.

Firmware is typically read-only at runtime and during boot, but may be updated during a specialized firmware update process. Updated firmware may provide additional features as well as stability and security improvements. Modern operating systems may delegate the firmware update process to pre-boot firmware. However, typical pre-boot firmware executes with all components of the computing device in a fully operational power state (e.g., the "S0" state). Therefore, applying pre-boot firmware updates may have high energy requirements, which is an important consideration for battery-operated mobile computing devices.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
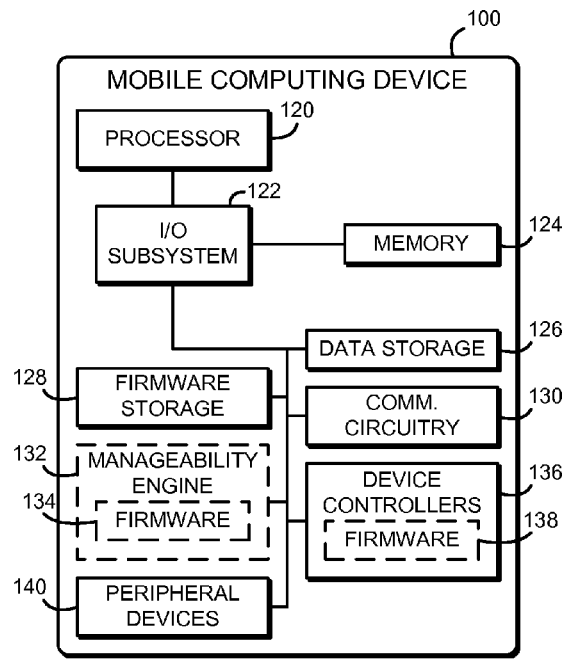
FIG. 1 is a simplified block diagram of at least one embodiment of a mobile computing device for selective power management during pre-boot firmware updates.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative mobile computing device 100 applies selective power management to its components during a pre-boot firmware update process. In use, as described below, the operating system of the mobile computing device 100 receives one or more firmware updates, for example from a remote server maintained by a device manufacturer. The operating system stages the firmware updates to be updated in the next boot cycle, and resets the system. Upon reboot, the operating system loader detects the staged firmware updates, passes the firmware updates to the platform firmware as a capsule, and resets the system in update capsule mode. Upon further reboot, the platform firmware extracts the firmware updates from the capsule and applies the firmware updates. While applying the firmware update, the platform firmware selectively power manages components of the mobile computing device 100; that is, the platform firmware powers up or enables components required to apply the firmware update and powers down or disables components not required to apply the firmware updates. After applying the firmware updates, the platform firmware resets the system yet again, and the mobile computing device 100 reboots with the newly-updated firmware.

The disclosed technologies allow for reduced power use during firmware updates, which is important for battery-powered devices and other devices operating on a limited power budget, such as high-density datacenter servers. For battery-powered devices, reducing power usage decreases the risk that power may be lost during a firmware update. Additionally, with reduced power usage, firmware may be updated more frequently, which may increase device stability and/or security.

The mobile computing device 100 may be embodied as any type of device for performing the functions described herein. For example, the mobile computing device 100 may be embodied as, without limitation, a smart phone, a tablet computer, a laptop computer, a notebook computer, a mobile computing device, a cellular telephone, a handset, a messaging device, a vehicle telematics device, a distributed computing system, a multiprocessor system, a consumer electronic device, and/or any other computing device configured to perform the functions described herein. As shown in FIG. 1, the illustrative mobile computing device 100 includes a processor 120, an input/output subsystem 122, a memory 124, a data storage device 126, and firmware storage 128. Of course, the mobile computing device 100 may include other or additional components, such as those commonly found in a portable computer (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments. Furthermore, although illustrated as a mobile computing device 100, it should be understood that the following disclosure may apply equally to a substantially stationary computing device such as a desktop computer, a workstation, or a server computer.

The processor 120 may be embodied as any type of processor capable of performing the functions described herein. For example, the processor 120 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the mobile computing device 100 such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the mobile computing device 100. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the mobile computing device 100, on a single integrated circuit chip.

The data storage device 126 may be embodied as any type of device or devices configured for short-term or long-term storage of data such as, for example, memory devices and circuits, memory cards, hard disk drives, solid-state drives, or other data storage devices. The data storage device 126 may include a system partition that stores data and firmware code for the mobile computing device 100. The data storage device 126 may also include an operating system partition that stores data files and executables for an operating system of the mobile computing device 100.

The mobile computing device 100 further includes firmware storage 128. The firmware storage 128 may be embodied as any device configured for persistent storage of platform firmware for the mobile computing device 100. Platform firmware may include low-level instructions or software for initializing hardware, managing basic input/output, hosting a pre-boot execution environment, and selecting and launching one or more operating systems. The firmware storage 128 may be embodied as, for example, a flash memory chip, or as a small amount of complementary metal-oxide semiconductor ("CMOS") memory coupled with a battery backup. In some embodiments, part or all of the firmware storage 128 may be embodied as a firmware volume resident on the data storage device 126. In some embodiments, the firmware storage 128 may be incorporated into one or more other components of the mobile computing device 100, for example into the I/O subsystem 122.

The mobile computing device 100 further includes a communication circuit 130, which may be embodied as any communication circuit, device, or collection thereof, capable of enabling communications between the mobile computing device 100 and remote computing devices. The communication circuit 130 may be configured to use any one or more communication technology (e.g., wireless or wired communications) and associated protocols (e.g., Ethernet, Bluetooth®, Wi-Fi®, WiMAX, etc.) to effect such communication. The communication circuit 130 may be embodied as a network adapter, including a wireless network adapter.

In some embodiments, the mobile computing device 100 may include a manageability engine 132. The manageability engine 132 is embodied as a device that supports configuration, control, or management of the mobile computing device 100. In some embodiments, the manageability engine 132 may be capable of operating independently of the state of the rest of the mobile computing device 100, including when the mobile computing device 100 is powered off or executing a pre-boot environment. To support such independent operation, the manageability engine 132 may include an out-of-band processor that is separate and distinct from the main processor 120 of the mobile computing device 100. Further, in some embodiments, the manageability engine 132 is also capable of communicating using the communication circuit 130 independently of the state of the mobile computing device 100 (e.g., independently of the state of the main processor 120), also known as "out-of-band" communication. The manageability engine 132 may execute or access dedicated firmware 134. In some embodiments, the firmware 134 may be incorporated in or dedicated to the manageability engine 132. Additionally or alternatively, the manageability engine 132 may execute or access firmware stored in the firmware storage 128. In some embodiments, the manageability engine 132 may be incorporated into or otherwise form a part of the I/O subsystem 122.

The mobile computing device 100 further includes a number of device controllers 136. Each of the device controllers 136 is configured to interface with and/or otherwise control hardware components of the mobile computing device 100. Each of the device controllers 136 may be selectively power managed. That is, the mobile computing device 100 may set the power consumption level of each of the device controllers 136. Possible power consumption levels include fully powered down, fully powered on, and intermediate power levels such as suspend or standby. The device controllers 136 may include input/output controllers such as a serial peripheral interface ("SPI") controller, a keyboard and system controller ("KSC"), an ExpressCard® ("EC") controller, or a universal serial bus ("USB") controller; disk controllers; network controllers; display controllers; or controllers for any other hardware component of the mobile computing device 100. The device controllers 136 may be embodied as discrete chips or may be incorporated or packaged with another component of the mobile computing device 100 such as the I/O subsystem 122. Each of the device controllers 136 may include dedicated firmware 138. The firmware 138 may be embodied as flash memory, electrically erasable read-only memory ("EEPROM"), or other non-volatile memory embedded in or coupled to a device controller 136.

The mobile computing device 100 further includes a number of peripheral devices 140. Such peripheral devices 140 may include any number of additional input/output devices, interface devices, and/or other peripheral devices. For example, in some embodiments, the peripheral devices 140 may include a camera, sound card, display, keyboard, speaker system, and/or other input/output devices, interface devices, and/or peripheral devices. The mobile computing device 100 may selectively power manage some or each of the peripheral devices 140. In some embodiments, the peripheral devices 140 may be controlled—including power managed—by one or more of the device controllers 136. For example, the mobile computing device 100 may instruct a device controller 136 to power down all attached peripheral devices 140.

Figure 2:
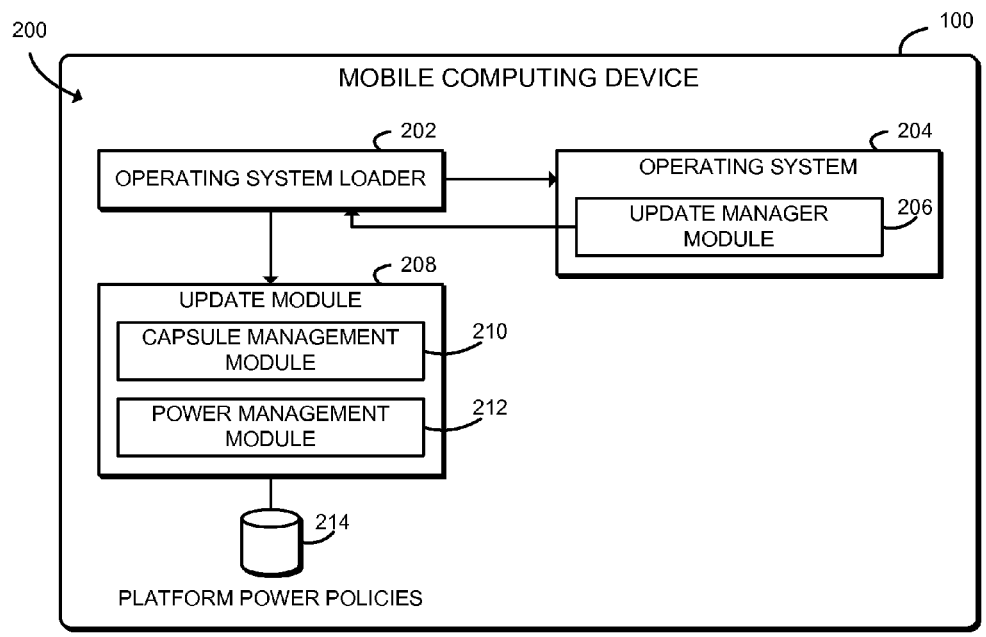
FIG. 2 is a simplified block diagram of at least one embodiment of an environment of the mobile computing device of FIG. 1.

Referring now to FIG. 2, in the illustrative embodiment, the mobile computing device 100 establishes an environment 200 during operation. The illustrative environment 200 includes an operating system loader 202, an operating system 204, and an update module 208. Although the illustrative embodiment 200 includes a single operating system 204, in other embodiments the environment 200 may include more than one operating system 204 executing natively or in a virtualized manner. The various modules of the environment 200 may be embodied as hardware, firmware, software, or a combination thereof.

The operating system loader 202 is configured to launch the operating system 204 from a pre-boot environment. The operating system loader 202 is also configured to determine whether the operating system 204 has staged one or more firmware updates to be applied during boot. If so, the operating system loader 202 may pass the staged firmware updates to the update module 208.

The operating system 204 is configured, among many other things, to stage firmware updates to be applied during the boot process. The firmware updates may be received from an external server such as a web server associated with a device manufacturer (not shown). As described further below, the firmware updates may be directed to platform firmware stored in the firmware storage 128, manageability engine firmware stored in the firmware 134, or device controller firmware stored in the firmware 138. The operating system 204 may trigger a reboot after staging the firmware update. In some embodiments, those functions may be performed by a sub-module, for example by an update manager module 206.

The update module 208 is configured to extract one or more firmware updates generated by the operating system 204 and apply the firmware updates in a pre-boot environment. The firmware updates may be transferred from the operating system 204 to the update module 208 as a capsule, which is an in-memory block of data. The capsule may be transferred using, for example, the UpdateCapsule( ) function defined in the UEFI specification. While applying the firmware updates, the update module 208 adjusts the power consumption settings of the hardware components of the mobile computing device 100, based on a set of platform power policies 214. The platform power policies 214 are a set of rules that define power consumption settings based on the particular firmware update. In general the platform power policies 214 define that the hardware components required to apply a particular firmware update are to be powered up, while non-required hardware components are to be powered down. The platform power policies 214 may also define intermediate power consumption settings such as sleep or standby modes. The update module 208 may indicate the status of the firmware updates (e.g., success or failure) to the operating system 204. In some embodiments, the functions of the update module 208 may be performed by one or more sub-modules, for example by a capsule management module 210 or a power management module 212.

Figure 3:
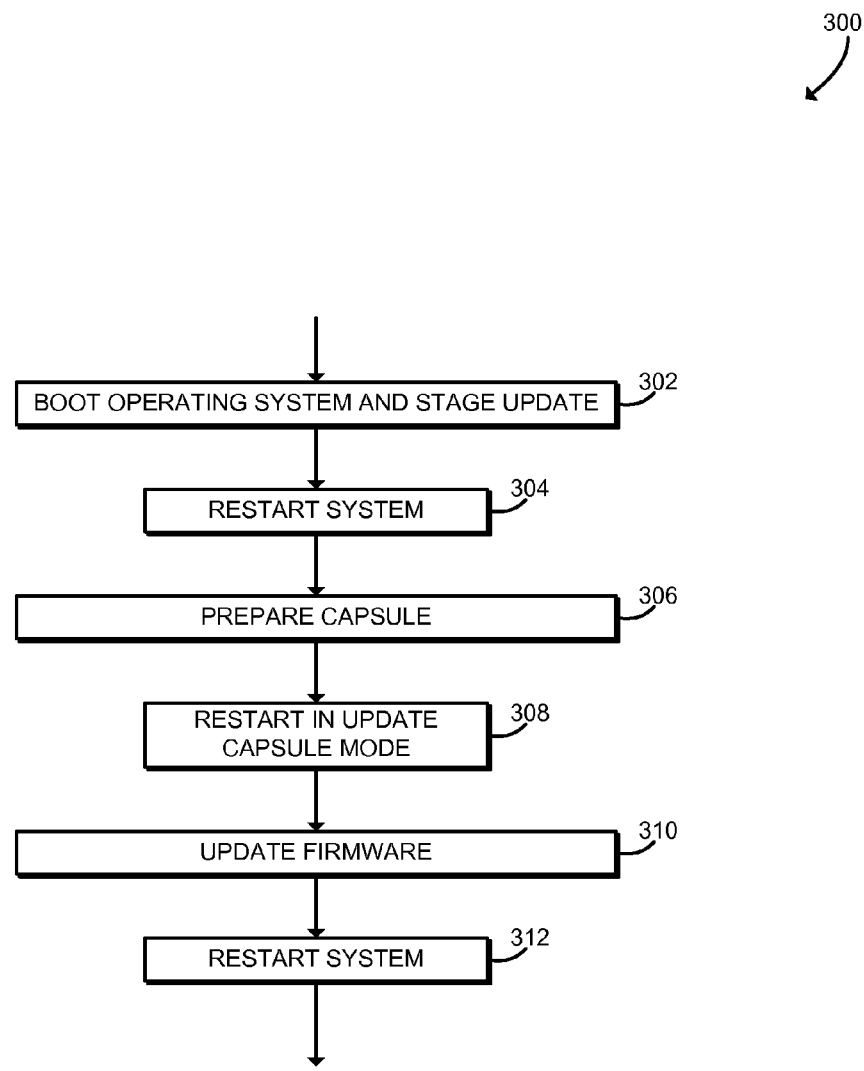
FIG. 3 is an overview diagram of at least one embodiment of a method for updating firmware that may be executed by the mobile computing device of FIGS. 1 and 2.

Referring now to FIG. 3, the mobile computing device 100 may execute a method 300 to update firmware of the device 100. The method 300 is illustrated in FIG. 3 as an overview of a more specific method 400 described below in regard to FIG. 4. As shown in FIG. 3, the method 300 may be executed across several reboot cycles by the mobile computing device 100. The method 300 begins with block 302, in which the mobile computing device 100 boots the operating system 204 normally, and the operating system 204 stages a firmware update for the next boot cycle. In block 304, the mobile computing device 100 restarts normally. After the restart, in block 306 the mobile computing device 100 prepares a capsule based on the staged firmware update. In block 308, the mobile computing device performs a warm restart into a special update capsule mode. In the update capsule mode, in block 310 the mobile computing device updates the firmware based on the previously prepared capsule. After updating the firmware, in block 312 the mobile computing device 100 again restarts normally.

Figure 4:
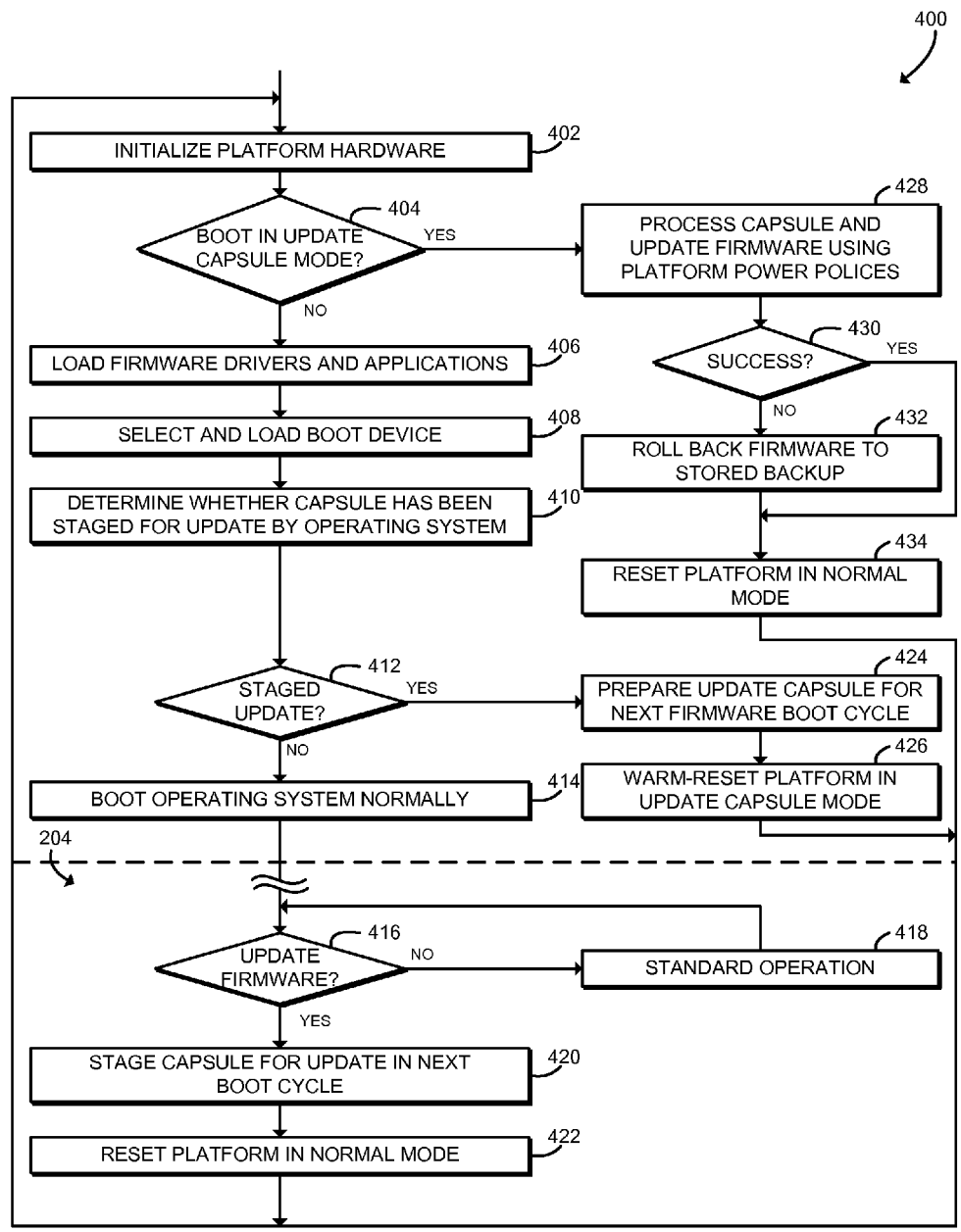
FIG. 4 is a simplified flow diagram of at least one embodiment of a method for updating firmware that may be executed by the mobile computing device of FIGS. 1 and 2.

Referring now to FIG. 4, one specific embodiment of the method 300 is shown as a method 400, which may be executed by the mobile computing device 100 for updating firmware. The method 400 begins in block 402, in which the mobile computing device 100 initializes platform hardware in a pre-boot environment. For example, the mobile computing device 100 may initialize particular components required to execute platform firmware, for example the memory 124 and the I/O subsystem 122. The platform hardware may be initialized as part of an initial boot of the mobile computing device 100, for example when a user powers on the device, or in response to a platform reset as described below.

In block 404, the mobile computing device 100 determines whether the platform has been booted in update capsule mode. As described further below, the mobile computing device 100 may programmatically trigger a reset of the system. When triggering the reset, the mobile computing device 100 may specify a boot mode. For example, the mobile computing device 100 may specify the boot mode as an argument to the ResetSystem( ) function defined in the UEFI specification. To determine the boot mode, the mobile computing device 100 may check a pre-defined or established volatile or non-volatile memory location. For example, the mobile computing device 100 may check the value of one or more firmware variables in the platform non-volatile store. The mobile computing device 100 may check the boot mode early in the boot process, before fully initializing components such as the memory 124, to avoid clearing information that may be used later in the boot process. If booted in update capsule mode, the method 400 branches to block 428 to process the capsule, as described below. If not booted in update capsule mode (e.g. if booted in normal mode), the method 400 advances to block 406.

In block 406, the mobile computing device 100 loads and starts firmware images, which may include firmware drivers and/or firmware applications. The firmware images complete platform initialization, install firmware protocol interfaces, and perform other pre-boot operations for the mobile computing device 100. Firmware images may be embodied as binary images stored in a system partition of the data storage device 126, as detailed by the UEFI specification. The particular drivers and applications to be loaded are platform-dependent and may be enumerated in firmware variables of the mobile computing device 100.

In block 408, the mobile computing device 100 selects and loads a boot device. The boot device is a firmware application that will be loaded and started by the mobile computing device 100, and in the illustrative embodiment is the operating system loader 202. In some embodiments, the boot device may include diagnostic, maintenance, or management applications. The particular boot device selected may be specified in global variables of the mobile computing device 100. In some embodiments, the boot device may be selected by a user of the mobile computing device 100 through a menu or other means presented by the mobile computing device 100.

In block 410, the mobile computing device 100 determines whether a capsule has been staged for an update by the operating system 204. This determination may be performed by the operating system loader 202. As described below, the operating system 204 may stage a capsule for update by storing a file in a defined location on the data storage device 126. That location may be outside of any firmware volume of the data storage device 126, for example in the system root directory of the operating system 204. Thus, the operating system loader 202 may search that location of the data storage device 126 to determine whether a capsule has been staged for update. In block 412, the mobile computing device 100 determines whether a capsule is staged. If a capsule is staged, the method 400 branches to block 424, described below. If not staged, the method 400 advances to block 414.

In block 414, the mobile computing device 100 boots the operating system 204 normally. The operating system loader 202 passes control of the mobile computing device 100 from the pre-boot environment of the firmware to the operating system 204. For example, the operating system loader 202 may call the ExitBootServices( ) function defined by the UEFI specification.

In block 416, the mobile computing device 100 determines whether to update firmware. A firmware update may be initiated automatically, for example when the mobile computing device 100 downloads updated firmware from a trusted source using the communication circuit 130. In some embodiments, the firmware update may be initiated by a user, for example through an interactive hardware management utility. If not updating the firmware, the method 400 branches to block 418. In block 418, the mobile computing device 100 performs standard operations such as executing user applications. After block 418, the method 400 loops back to block 416 to continue monitoring for firmware updates. Referring back to block 416, if the mobile computing device 100 determines to update firmware, the method 400 advances to block 420.

In block 420, the mobile computing device 100 stages a capsule for an update in the next boot cycle. As described above, to stage the capsule, the operating system 204 may store the capsule in a well-defined location on the data storage device 126. The capsule may be embodied as a data structure that may be used to communicate data from the operating system at runtime to the pre-boot firmware environment. The capsule typically begins with a header segment, followed by arbitrary binary information that may include code and/or data segments. Thus, one or more firmware updates may be encoded and packaged into a single capsule. In some embodiments, the operating system 204 may completely encode the capsule at runtime, and stage the encoded capsule on the data storage device 126. Additionally or alternatively, the operating system 204 may stage firmware updates on the data storage device 126, and the capsule may be generated by the operating system loader 202, as described below. The capsule may be formatted as an EFI_UPDATE_CAPSULE as defined by the UEFI specification.

In block 422, the mobile computing device 100 resets the platform in normal mode. In some embodiments, the mobile computing device 100 may confirm that adequate battery power remains (e.g., at least 25% of total capacity) or that the mobile computing device 100 is connected to AC power. Before resetting the platform, the mobile computing device 100 may also confirm that the user wishes to perform the firmware update, for example, by prompting the user whether to reboot the platform. After resetting the platform, the method 400 loops back to block 402 to initialize platform hardware.

Referring back to block 412, the mobile computing device 100 determines whether a capsule has been staged for a firmware update. As described above, this determination may be performed by the operating system loader 202. If staged for an update, the method 400 branches to block 424. In block 424, the mobile computing device 100 prepares the update capsule for the next firmware boot cycle. To do so, the mobile computing device 100 loads the capsule into the memory 124. As described above, in some embodiments the operating system loader 202 may load and format one or more firmware updates into the in-memory capsule. In some embodiments, the capsule may be stored in the memory 124 using a virtual addressing mode. In those embodiments, the mobile computing device 100 may also prepare an in-memory table to map virtual memory addresses to physical addresses usable by pre-boot firmware. The mobile computing device 100 may pass the capsule to the firmware using the UpdateCapsule( ) function defined in the UEFI specification. The capsule may be flagged or otherwise configured to persist across platform resets.

In block 426, the mobile computing device 100 warm-resets the platform in the update capsule mode. A warm reset causes the platform to reboot but does not clear the contents of the memory 124. Therefore, the capsule will be available to the firmware for processing upon subsequent reboot. The mobile computing device 100 may warm-reset the system by supplying a reset type associated with the capsule when resetting the system. For example, the mobile computing device 100 may call the QueryCapsuleCapabilities( ) function of the UEFI specification to obtain the reset value. After warm-resetting the system, the method 400 loops back to block 402 to initialize platform hardware.

Referring back to block 404, the mobile computing device 100 determines whether it has been booted in update capsule mode. As described above, data stored in volatile or non-volatile memory may indicate the boot mode. If booted in update capsule mode, the method 400 branches to block 428. In block 428, the mobile computing device 100 processes the update capsule (or capsules) and updates firmware using the platform power policies 214. Updating the firmware using the platform power policies 214 is described further in connection with FIG. 5, below.

In block 430, the mobile computing device 100 determines whether the firmware was successfully updated. To make this determination, the mobile computing device 100 may check data stored in volatile or non-volatile memory. For example, the capsule update status may be stored in the EFI system resource table ("ESRT"). If the firmware update was not successful, the method 400 may advance to block 432, in which the firmware is rolled back to a previously stored backup. After rolling back the firmware, the method 400 advances to block 434. Referring back to block 430, if the firmware update was successful, the method 400 branches to block 434.

In block 434, the mobile computing device 100 resets the platform in normal mode. The mobile computing device 100 may execute a cold reset, that is, the mobile computing device 100 may clear the contents of memory 124 and fully re-initialize platform hardware. Upon rebooting, the mobile computing device 100 will execute any newly-updated firmware. After resetting the system, the method 400 loops back to block 402 to initialize platform hardware.

Figure 5:
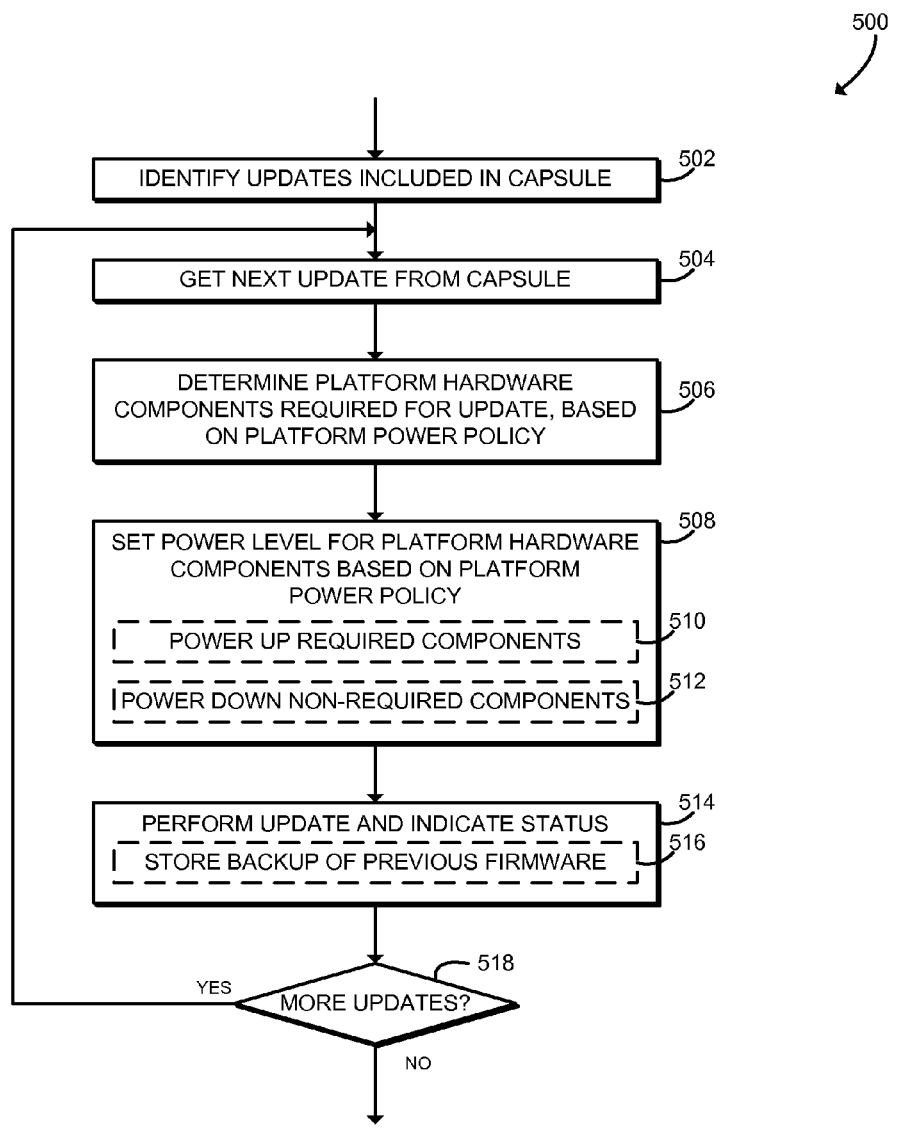
FIG. 5 is a simplified flow diagram of at least one embodiment of a method for selective power management during a pre-boot firmware update that may be executed by the computing device of FIGS. 1 and 2.

Referring now to FIG. 5, in use, the mobile computing device 100 may execute a method 500 for selective power management while applying firmware updates. As described above in connection with block 428 of FIG. 4, the method 500 may be executed in a pre-boot firmware environment, when the platform has been booted in an update capsule mode. The method 500 begins with block 502, in which the mobile computing device 100 identifies firmware updates included in the capsule. Prior to processing the capsule, the mobile computing device 100 may copy the capsule contents into a contiguous segment of physical memory. As described above, the capsule may begin with a standard header, followed by a block of arbitrary binary information (a "binary blob"). The binary information may be formatted in any format usable by the mobile computing device 100. For example, the binary information may be formatted as a firmware volume as defined by the UEFI specification. The mobile computing device 100 may enumerate or otherwise unpack all of the firmware updates contained within the capsule.

In block 504, the mobile computing device 100 retrieves the next firmware update from the capsule. Each firmware update may include code and/or data to be installed in a firmware device of the mobile computing device 100, and may also include installation or management code required to apply the firmware update. For example, the firmware update may include updated platform firmware to be stored in the firmware storage 128, updated manageability engine firmware to be stored in the firmware 134, or updated device controller firmware to be stored in the firmware 138. Each individual firmware update may be in any format useable to update the firmware. For example, a firmware update may be embodied as a firmware driver containing code that, when executed, updates an appropriate firmware device. The firmware driver may include an entry point, that is, a well-defined location within the firmware driver at which the mobile computing device 100 may begin executing code to apply the firmware update. In some embodiments, the firmware update may reference the capsule to access the data to be stored in the firmware device.

In block 506, the mobile computing device 100 determines the platform hardware components required for the firmware update, based on the platform power policies 214. The mobile computing device 100 may determine a platform power policy 214 appropriate for the particular firmware update. For example, each firmware update may be associated with a particular hardware component that is identified by a globally unique identifier ("GUID"). The determined platform power policy 214 may identify required hardware components for the firmware update, including required power consumption settings. The particular hardware components required is platform-specific; therefore, the manufacturer of the mobile computing device 100 and/or the developer of the platform firmware may maintain the platform power policies 214.

In block 508, the mobile computing device 100 sets the power level for platform hardware components based on the appropriate platform power policy 214. The available power levels are platform- and component-specific. For example, some hardware components may be powered off completely or fully powered on. Other hardware components may have multiple available power levels such as completely off, standby, suspend, or completely powered on, or may have adjustable parameters such as clock speed and/or voltage. In block 510, in some embodiments the mobile computing device 100 may power up hardware components required for the firmware update. For example, when updating the platform firmware, the mobile computing device 100 may power up the processor 120, the firmware storage 128, and a device controller 136 for the SPI bus. As another example, when updating firmware for the manageability engine 132, the mobile computing device 100 may power up the processor 120 and the device controller 136 for the SPI bus. As a third example, when updating firmware for a peripheral device 140, the mobile computing device 100 may power up the processor 120 and the peripheral device 140. In block 512, in some embodiments the mobile computing device 100 may power down hardware components not required for the firmware update. For example, the mobile computing device 100 may power down peripheral devices 140 that are not being updated, or device controllers 136 for devices or buses that are not being updated.

In block 514, the mobile computing device 100 performs the firmware update and indicates the update status. Performing the update writes new firmware to the appropriate firmware device, for example the firmware storage 128, the manageability engine firmware 134, or a device controller firmware 138. In embodiments where the firmware update is embodied as a firmware driver, the mobile computing device 100 may perform the firmware update by beginning execution at the entry point of the firmware driver. The mobile computing device 100 may indicate the status of the firmware update (e.g., success or failure) by updating the EFI system resource table. The mobile computing device 100 may also export or otherwise make the status information available to the operating system 204. In some embodiments, in block 516 the mobile computing device 100 may store a backup of the previous firmware, which may be used to roll back the firmware in the event of a failed update. The previous firmware may be stored, for example, in a system volume of the data storage device 126.

In block 518, the mobile computing device 100 determines whether additional firmware updates remain. The mobile computing device 100 may examine the contents of the capsule, as described above. If additional firmware updates remain, the method 500 loops back to block 504 to retrieve the next update capsule. If no additional firmware updates remain, the method 500 is completed. As described above, the mobile computing device 100 may subsequently reboot using the newly updated firmware.

Although the disclosed technologies have been described in terms of a mobile computing device, it should be understood that the disclosed technologies are equally applicable to other computing devices. For example, the disclosed technologies may be incorporated in desktop computers, servers, or other primarily stationary computing devices.

EXAMPLES

Example 1 includes a mobile computing device for updating firmware in a pre-boot environment, the mobile computing device comprising: a capsule management module to extract a firmware update from a capsule previously generated by an operating system of the mobile computing device; a power management module to: determine a power consumption setting for a hardware component of the mobile computing device as a function of the firmware update; and configure the hardware component based on the power consumption setting; and an update module to apply the firmware update in response to configuration of the hardware component based on the power consumption setting.

Example 2 includes the subject matter of Example 1, and wherein the firmware update comprises a firmware driver; and to apply the firmware update comprises to execute an entry point of the firmware driver.

Example 3 includes the subject matter of any of Examples 1 and 2, and wherein to determine the power consumption setting comprises to: determine a power policy of the mobile computing device as a function of the firmware update, the power policy to define power levels of a plurality of hardware components of the mobile computing device; and determine the hardware component and the power consumption setting as a function of the power policy.

Example 4 includes the subject matter of any of Examples 1-3, and wherein to determine the power policy comprises to determine the power policy based on a unique identifier of the firmware update.

Example 5 includes the subject matter of any of Examples 1-4, and wherein the hardware component comprises a peripheral device of the mobile computing device.

Example 6 includes the subject matter of any of Examples 1-5, and wherein the hardware component comprises a device controller of the mobile computing device.

Example 7 includes the subject matter of any of Examples 1-6, and wherein the device controller comprises a serial peripheral interface ("SPI") controller, a keyboard and system controller ("KSC"), a network controller, a wireless network controller, a near-field communication ("NFC") controller, an express card ("EC") controller, or a universal serial bus ("USB") controller.

Example 8 includes the subject matter of any of Examples 1-7, and wherein to configure the hardware component based on the power consumption setting comprises to reduce a power consumption of the hardware component relative to a fully operational state of the hardware component.

Example 9 includes the subject matter of any of Examples 1-8, and wherein to configure the hardware component based on the power consumption setting comprises to increase a power consumption of the hardware component relative to a current power consumption of the hardware component.

Example 10 includes the subject matter of any of Examples 1-9, and wherein to apply the firmware update comprises to apply the firmware update to a manageability engine of the mobile computing device.

Example 11 includes the subject matter of any of Examples 1-10, and wherein to apply the firmware update comprises to apply the firmware update to a device controller of the mobile computing device.

Example 12 includes the subject matter of any of Examples 1-11, and wherein to configure the hardware component based on the power consumption setting comprises to reduce a power consumption of the hardware component relative to a fully operational state of the hardware component; and to apply the firmware update comprises to apply the firmware update to another hardware component of the mobile computing device different from the hardware component.

Example 13 includes the subject matter of any of Examples 1-12, and wherein the capsule management module is further to extract a second firmware update from the capsule; the power management module is further to: determine a second power consumption setting for a second hardware component of the mobile computing device as a function of the second firmware update; and configure the second hardware component based on the second power consumption setting; and the update module is further to apply the second firmware update in response to configuration of the second hardware component based on the second power consumption setting.

Example 14 includes the subject matter of any of Examples 1-13, and wherein to determine the second power consumption setting comprises to: determine a second power policy of the mobile computing device as a function of the second firmware update; and determine the second hardware component and the second power consumption setting as a function of the second power policy.

Example 15 includes the subject matter of any of Examples 1-14, and wherein the second hardware component comprises the hardware component; and the second power consumption setting is different from the power consumption setting.

Example 16 includes the subject matter of any of Examples 1-15, and wherein the update module is further to indicate an update status in response to applying the firmware update, wherein the update status is accessible by the operating system.

Example 17 includes the subject matter of any of Examples 1-16, and wherein the pre-boot environment comprises the capsule management module, the power management module, and the update module.

Example 18 includes method for updating firmware of a mobile computing device in a pre-boot environment, the method comprising: extracting, by the mobile computing device, a firmware update from a capsule previously generated by an operating system of the mobile computing device; determining, by the mobile computing device, a power consumption setting for a hardware component of the mobile computing device as a function of the firmware update; configuring, by the mobile computing device, the hardware component based on the power consumption setting; and applying, by the mobile computing device, the firmware update in response to configuring the hardware component based on the power consumption setting.

Example 19 includes the subject matter of Example 18, and wherein extracting the firmware update comprises extracting a firmware driver; and applying the firmware update comprises executing an entry point of the firmware driver.

Example 20 includes the subject matter of any of Examples 18 and 19, and wherein determining the power consumption setting comprises: determining a power policy of the mobile computing device as a function of the firmware update, the power policy defining power levels of a plurality of hardware components of the mobile computing device; and determining the hardware component and the power consumption setting as a function of the power policy.

Example 21 includes the subject matter of any of Examples 18-20, and wherein determining the power policy comprises determining the power policy based on a unique identifier of the firmware update.

Example 22 includes the subject matter of any of Examples 18-21, and wherein the hardware component comprises a peripheral device of the mobile computing device.

Example 23 includes the subject matter of any of Examples 18-22, and wherein the hardware component comprises a device controller of the mobile computing device.

Example 24 includes the subject matter of any of Examples 18-23, and wherein the device controller comprises a serial peripheral interface ("SPI") controller, a keyboard and system controller ("KSC"), a network controller, a wireless network controller, a near-field communication ("NFC") controller, an express card ("EC") controller, or a universal serial bus ("USB") controller.

Example 25 includes the subject matter of any of Examples 18-24, and wherein configuring the hardware component based on the power consumption setting comprises reducing a power consumption of the hardware component relative to a fully operational state of the hardware component.

Example 26 includes the subject matter of any of Examples 18-25, and wherein configuring the hardware component based on the power consumption setting comprises increasing a power consumption of the hardware component relative to a current power consumption of the hardware component.

Example 27 includes the subject matter of any of Examples 18-26, and wherein applying the firmware update comprises applying the firmware update to a manageability engine of the mobile computing device.

Example 28 includes the subject matter of any of Examples 18-27, and wherein applying the firmware update comprises applying the firmware update to a device controller of the mobile computing device.

Example 29 includes the subject matter of any of Examples 18-28, and wherein configuring the hardware component based on the power consumption setting comprises reducing a power consumption of the hardware component relative to a fully operational state of the hardware component; and applying the firmware update comprises applying the firmware update to another hardware component of the mobile computing device different from the hardware component.

Example 30 includes the subject matter of any of Examples 18-29, and further including extracting, by the mobile computing device, a second firmware update from the capsule; determining, by the mobile computing device, a second power consumption setting for a second hardware component of the mobile computing device as a function of the second firmware update; configuring, by the mobile computing device, the second hardware component based on the second power consumption setting; and applying, by the mobile computing device, the second firmware update in response to configuring the second hardware component based on the second power consumption setting.

Example 31 includes the subject matter of any of Examples 18-30, and wherein determining the second power consumption setting comprises: determining a second power policy of the mobile computing device as a function of the second firmware update; and determining the second hardware component and the second power consumption setting as a function of the second power policy.

Example 32 includes the subject matter of any of Examples 18-31, and wherein the second hardware component comprises the hardware component; and the second power consumption setting is different from the power consumption setting.

Example 33 includes the subject matter of any of Examples 18-32, and further including indicating, by the mobile computing device, an update status in response to applying the firmware update, wherein the update status is accessible by the operating system.

Example 34 includes the subject matter of any of Examples 18-33, and wherein extracting the firmware update, determining the power consumption setting, configuring the hardware component, and applying the firmware update all occur in the pre-boot environment.

Example 35 includes a computing device comprising a processor; and a memory having stored therein a plurality of instructions that when executed by the processor cause the computing device to perform the method of any of Examples 18-34.

Example 36 includes one or more machine-readable storage media comprising a plurality of instructions stored thereon that in response to being executed result in a computing device performing the method of any of Examples 18-34.

Example 37 includes a computing device comprising means for performing the method of any of Examples 18-34.

The invention claimed is:

1. A mobile computing device for updating firmware in a pre-boot environment, the mobile computing device comprising:
   a capsule management module to extract a firmware update from a capsule previously generated by an operating system of the mobile computing device;
   a power management module to:
      determine a power consumption setting for a hardware component of the mobile computing device as a function of the firmware update; and
      reduce a power consumption of the hardware component relative to a fully operational state of the hardware component based on the power consumption setting; and
   an update module to apply the firmware update in response to configuration of the hardware component based on the power consumption setting.

2. The mobile computing device of claim 1, wherein to determine the power consumption setting comprises to:
   determine a power policy of the mobile computing device as a function of the firmware update, the power policy to define power levels of a plurality of hardware components of the mobile computing device; and
   determine the hardware component and the power consumption setting as a function of the power policy.

3. The mobile computing device of claim 1, wherein:
to apply the firmware update comprises to apply the firmware update to another hardware component of the mobile computing device different from the hardware component.

4. The mobile computing device of claim 1, wherein:
the capsule management module is further to extract a second firmware update from the capsule;
the power management module is further to:
  determine a second power consumption setting for a second hardware component of the mobile computing device as a function of the second firmware update; and
  configure the second hardware component based on the second power consumption setting; and
the update module is further to apply the second firmware update in response to configuration of the second hardware component based on the second power consumption setting.

5. The mobile computing device of claim 4, wherein to determine the second power consumption setting comprises to:
determine a second power policy of the mobile computing device as a function of the second firmware update; and
determine the second hardware component and the second power consumption setting as a function of the second power policy.

6. The mobile computing device of claim 4, wherein:
the second hardware component comprises the hardware component; and
the second power consumption setting is different from the power consumption setting.

7. The mobile computing device of claim 1, wherein the pre-boot environment comprises the capsule management module, the power management module, and the update module.

8. A method for updating firmware of a mobile computing device in a pre-boot environment, the method comprising:
extracting, by the mobile computing device, a firmware update from a capsule previously generated by an operating system of the mobile computing device;
determining, by the mobile computing device, a power consumption setting for a hardware component of the mobile computing device as a function of the firmware update;
reducing, by the mobile computing device, a power consumption of the hardware component relative to a fully operational state of the hardware component based on the power consumption setting; and
applying, by the mobile computing device, the firmware update in response to configuring the hardware component based on the power consumption setting.

9. The method of claim 8, wherein determining the power consumption setting comprises:
determining a power policy of the mobile computing device as a function of the firmware update, the power policy defining power levels of a plurality of hardware components of the mobile computing device; and
determining the hardware component and the power consumption setting as a function of the power policy.

10. The method of claim 8, wherein:
applying the firmware update comprises applying the firmware update to another hardware component of the mobile computing device different from the hardware component.

11. The method of claim 8, further comprising:
extracting, by the mobile computing device, a second firmware update from the capsule;
determining, by the mobile computing device, a second power consumption setting for a second hardware component of the mobile computing device as a function of the second firmware update;
configuring, by the mobile computing device, the second hardware component based on the second power consumption setting; and
applying, by the mobile computing device, the second firmware update in response to configuring the second hardware component based on the second power consumption setting.

12. The method of claim 11, wherein:
the second hardware component comprises the hardware component; and
the second power consumption setting is different from the power consumption setting.

13. One or more non-transitory, computer-readable storage media comprising a plurality of instructions that in response to being executed cause a mobile computing device to:
extract a firmware update from a capsule previously generated by an operating system of the mobile computing device;
determine a power consumption setting for a hardware component of the mobile computing device as a function of the firmware update;
reduce a power consumption of the hardware component relative to a fully operational state of the hardware component based on the power consumption setting; and
apply the firmware update in response to configuring the hardware component based on the power consumption setting.

14. The one or more non-transitory, computer-readable storage media of claim 13, wherein to determine the power consumption setting comprises to:
determine a power policy of the mobile computing device as a function of the firmware update, the power policy defining power levels of a plurality of hardware components of the mobile computing device; and
determine the hardware component and the power consumption setting as a function of the power policy.

15. The one or more non-transitory, computer-readable storage media of claim 13, wherein:
to apply the firmware update comprises to apply the firmware update to another hardware component of the mobile computing device different from the hardware component.

16. The one or more non-transitory, computer-readable storage media of claim 13, further comprising a plurality of instructions that in response to being executed cause the mobile computing device to:
extract a second firmware update from the capsule;
determine a second power consumption setting for a second hardware component of the mobile computing device as a function of the second firmware update;
configure the second hardware component based on the second power consumption setting; and
apply the second firmware update in response to configuring the second hardware component based on the second power consumption setting.

17. The one or more non-transitory, computer-readable storage media of claim 16, wherein to determine the second power consumption setting comprises to:

determine a second power policy of the mobile computing device as a function of the second firmware update; and determine the second hardware component and the second power consumption setting as a function of the second power policy.

18. The one or more computer-readable storage media of claim 16, wherein:

the second hardware component comprises the hardware component; and the second power consumption setting is different from the power consumption setting.

19. The one or more non-transitory, computer-readable storage media of claim 13, wherein to extract the firmware update, to determine the power consumption setting, to configure the hardware component, and to apply the firmware update all occur in a pre-boot environment of the mobile computing device.

\* \* \* \* \*